Jan. 27, 1953 L. TOMLINSON 2,626,531
SAW SETTING TOOL
Filed Jan. 5, 1951
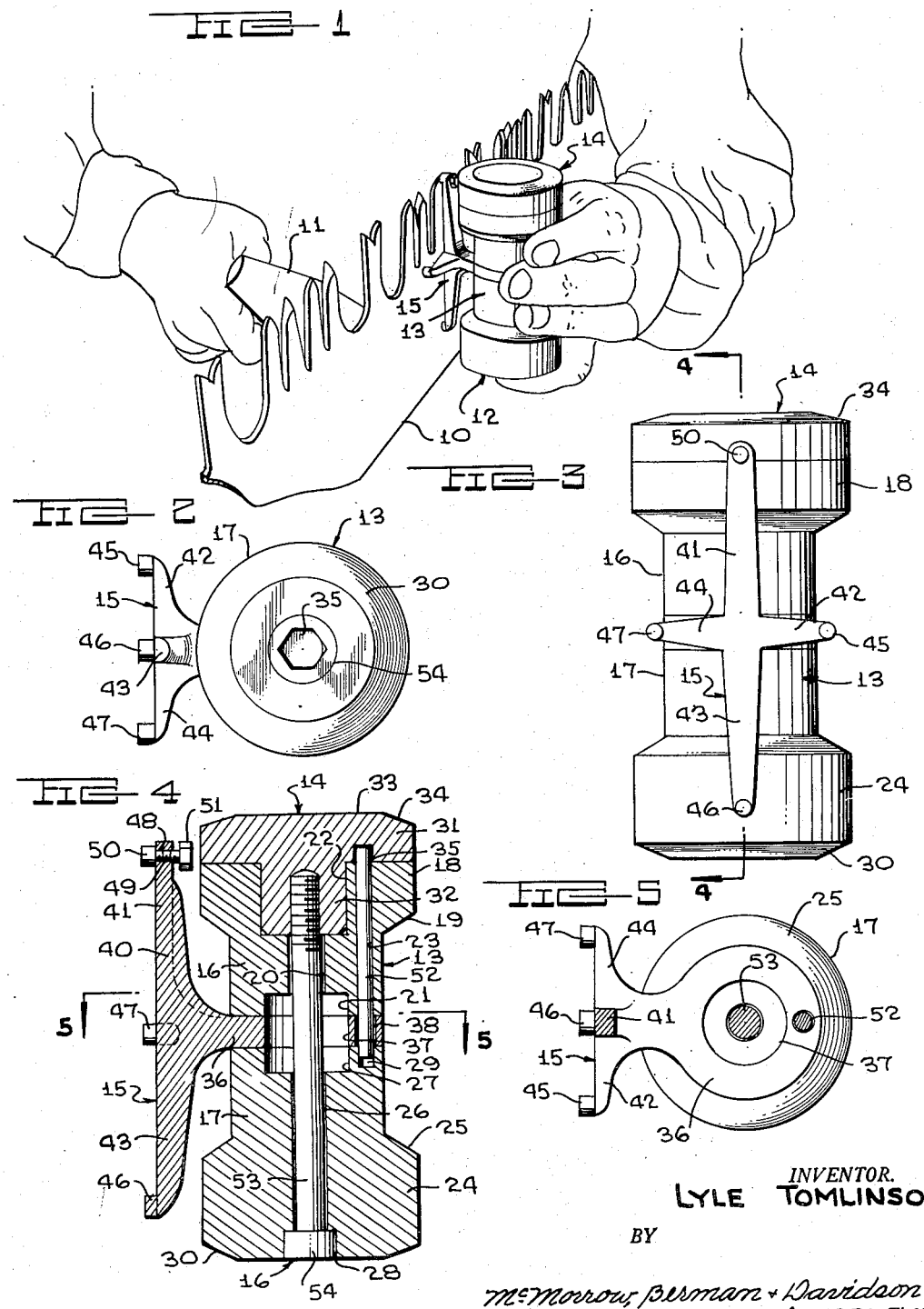
INVENTOR.
LYLE TOMLINSON
BY
McMorrow, Berman & Davidson
ATTORNEYS Patented Jan. 27, 1953

2,626,531

UNITED STATES PATENT OFFICE 2,626,531

SAW SETTING TOOL

Lyle Tomlinson, Eugene, Oreg.

Application January 5, 1951, Serial No. 204,511

5 Claims. (Cl. 76—73)

This invention relates to saw setting tools and more particularly to a combined anvil and gauge tool for setting the teeth of crosscut and drag saws.

It is among the objects of the invention to provide an improved saw setting tool including a handle portion carrying interchangeable anvils for setting saw teeth to selected angles and carrying a gauge for accurately determining the set of the teeth; which tool, while of convenient size and shape and easy to handle, has sufficient weight to firmly back up saw teeth while the teeth are being bent or set by blows from a hammer or equivalent instrument; which includes an adjustable gauge that can be set to the desired angularity or set of the saw teeth; which is easy to assemble and disassemble for interchanging anvils and gauges; and which is simple and durable in construction, economical to manufacture, and easy and convenient to use.

Other objects and advantages will become apparent from a consideration of the following description and the appended claims in conjunction with the accompanying drawings wherein:

Figure 1 is a somewhat diagrammatic perspective view showing a portion of a crosscut saw and a saw setting tool illustrative of the invention held in operative position relative to the saw to gauge the set of a saw tooth;

Figure 2 is a bottom plan view of the tool illustrated in Figure 1;

Figure 3 is a side elevational view of the tool illustrated in Figure 1;

Figure 4 is a longitudinal cross-sectional view on the line 4—4 of Figure 3, and Figure 5 is a transverse cross-sectional view on the line 5—5 of Figure 4.

With continued reference to the drawing, the saw 10 illustrated in Figure 1 is a crosscut saw having long, heavy teeth which are usually set by striking them with an instrument, such as the hammer 11 held in the right hand of the person setting the saw. The saw setting tool of the present invention, generally indicated at 12, is held in the left hand of the person setting the saw and has an anvil for backing up the saw teeth while they are being bent by blows from the hammer 11 and a gauge for accurately measuring the set of the teeth, the tool being shown in Figure 1 with the gauge against the saw in operative position to measure the set of a saw tooth.

The saw setting tool comprises, in general, a handle structure 13, an anvil 14 secured to one end of the handle structure, a gauge 15 having a lug received in the handle structure and a bolt 16 extending through the handle structure and threaded into the anvil to clamp the lug of the gauge in the handle structure.

The handle structure 13 comprises two cylindrical bodies 16 and 17, preferably formed of iron or steel. The body 16 has at one end an enlarged cylindrical portion 18 with a beveled shoulder 19 at the inner end of the enlarged portion and has a bore 20 extending coaxially therethrough. This body is provided in its smaller end with a shallow counterbore 21 and in its larger end with a counterbore 22 of substantially the same diametrical size as the counterbore 21 but deeper than the latter counterbore, the two counterbores 21 and 22 being coaxial with the bore 20 and the axis of the body 16. This body is also provided with a bore 23 extending longitudinally therethrough spaced from and substantially parallel to the coaxial bore 20.

The body 17 is provided at one end with an enlarged portion 24 which is coaxial with the body and provided at its inner end with an inwardly directed, beveled shoulder 25 and with a bore 26 extending coaxially therethrough. This body is provided in its smaller end with a counterbore 27 which is of substantially the same size in depth as the counterbore 21 in the body 16 and in its larger end with a counterbore 28 smaller than the counterbore 27. This body 17 is also provided with a recess or well 29 opening to its smaller end and spaced from the bore 26 the same distance that the bore 23 is spaced from the bore 20 of the body 16. The body 17 is provided on its outer or larger end with a beveled annular surface 30 which is complementary to the beveled shoulder 25 at the opposite or inner end of the enlarged portion 24 of the body.

The anvil 14 is preferably formed of hardened steel and comprises a disc shaped portion 31 having a cylindrical periphery of substantially the same diameter as the cylindrical periphery of the enlarged end portion 18 of the body 16 and a cylindrical boss 32 on one side of the disc portion. The boss 32 is coaxial with the disc portion 31 and is of a size to be closely received in the counterbore 22 in the outer or larger end of the body 16. This boss is provided with a coaxial tapped hole 32 opening to the outer end thereof remote from the disc portion 31. On its other face the disc portion is provided with a flat surface 33 of circular shape disposed concentrically of the corresponding face of the anvil and with a beveled annular surface 34 surrounding the flat surface 33 and extending from the latter to the periphery of the disc portion of the anvil.

The diameter of the central flat surface 33 and the width and angularity of the beveled surface 34 of the anvil are varied for different shapes and sizes of saw teeth and the tool is preferably provided with a set of interchangeable anvils to increase its utility by accommodating it to a range of standard saw teeth.

The disc portion 31 of the anvil is provided in its surface adjacent the boss 32 with a well or recess 35 spaced from the axis of the anvil the same distance that the bore 33 is spaced from the axis of the body 16.

The gauge 15 comprises a lug 36 of cylindrical shape and having a diameter the same as the diameter of the smaller portions of the handle bodies 16 and 17. This lug is provided with a concentric opening 37 of the same diameter as the counterbores 21 and 27 and with an aperture 38 extending transversely therethrough at the same distance from the center of the lug as that from the axis of the body 16 to the bore 33.

A cruciform formation 40 is provided on the side of the lug 33 and has four arms 41, 42, 43 and 44 disposed at right angles to each other in the order named and having their outer surface in a common plane which is perpendicular to the two parallel planes including the opposite faces of the lug 36. The two arms 41 and 43 are of the same length and are longer than the arms 44 and 42 which are also of the same length. The longer arms 41 and 43 have a common center line disposed perpendicular to the planes of the opposite faces of the lug 36 and the two arms 42 and 44 have a common center line which lies midway between and parallel to the planes of the two opposite faces of the lug.

Contact buttons 45, 46 and 47 are provided on the outer ends of the arms 42, 43 and 44 respectively and have flat outer ends disposed in a common plane which is slightly spaced from and parallel to the plane of the outer sides of the arms. The arm 41 is provided near its outer end with a transversely extending, tapped hole 48 and a screw 49 extends through this hole and carries on its end at the outer side of the arm a contact button 50 and on its end at the inner side of the arm a bolt head 51 by means of which the screw may be turned to adjust the contact button 50 toward and away from the outer surface of the arm 41.

In assembling the device, the lug of the gauge 15 is placed on the smaller end of the body 17 and the smaller end of the body 16 is then placed on the opposite side of the lug. The aperture 38 in the lug and the recess 29 in the body 17 are then brought into alignment with the bore 23 in the body 16. A dowel pin 52 is then inserted through the bore 23 and the aperture 38 into the recess 29 and positioned with a corresponding end projecting outwardly of the larger end of the body 16. The bores 20 and 26 are then brought into alignment and a selected anvil is placed on the larger end of the body 16 with its boss received in the counterbore 22 and its recess 35 receiving the projecting end of the dowel pin 52. A bolt 53 screw threaded at one end and having on its other end a cylindrical head 54 provided with a recessed wrench socket 55 is inserted through the body 17 and the body 16 and threaded into the tapped hole 32 in the boss of the anvil until the head of the screw is received in the counterbore 28 at the larger end of the body 17 and the bodies 16 and 17 are firmly clamped at their smaller ends against the opposite sides of the lug 36 of the gauge.

The gauge is preferably mounted between the bodies 16 and 17 so that the adjustable button 50 is adjacent the anvil 14 in order to facilitate handling of the tool while it is being used for setting and gauging the saw teeth.

In using the tool, the outer end of the anvil is placed against a tooth with a portion of the beveled surface 34 of the anvil opposite the outer end portion of the tooth and the opposite side of the tooth is then struck with a hammer forcing the tooth over against the beveled surface of the anvil. When the tooth has been bent an amount estimated to provide the desired set, the anvil is removed from the tooth and the gauge 15 applied to the tooth and the side of the saw blade toward which the tooth is bent to check the set of the tooth. This process is repeated until all of the teeth are given the proper set, the tool being used on one side of the saw blade for some of the teeth and on the other side for other teeth.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A saw setting tool comprising cylindrical bodies each having an enlarged portion at one end and a bore extending coaxially therethrough, said bodies being disposed with their smaller ends mutually opposed and one of said bodies having a coaxial counterbore in the larger end thereof, a disc shaped anvil disposed on the larger end of said one body and having a beveled annular surface on its outer face and a lug on its inner face received in said counterbore, said boss having a tapped hole disposed coaxially therein and opening to the outer end thereof, a gauge including an apertured lug disposed between the smaller ends of said bodies and a cruciform structure on said lug the four arms of which structure have their outer surfaces substantially in a common plane and contact buttons at their distal ends, and a bolt extending through the bores in said cylindrical bodies and threaded at one end into the tapped hole in said anvil boss to clamp said bodies against the lug of said gauge.

2. A saw setting tool comprising an elongated handle structure, an anvil disposed on one end of said handle structure, and a gauge secured to said handle structure intermediate the length of the latter and adapted to be placed against the sides of a saw blade to measure the set of the saw teeth, said gauge comprising a cruciform structure having one part extending along and spaced from said handle structure and said anvil and another part extending transversely of said handle, said handle structure having a bore extending longitudinally therethrough and provided at one end with a counterbore, said anvil having on one side thereof a boss received in said counterbore and provided with a tapped hole in alignment with the bore in said handle structure, and a bolt extending through the bore in said handle structure and threaded into the tapped hole in the boss of said anvil to secure said anvil to said handle structure.

3. A saw setting tool comprising an elongated handle structure, an anvil disposed on one end of said handle structure, and a gauge secured to said handle structure intermediate the length of the latter and including a cruciform structure extending along and spaced from said handle structure and said anvil, said handle structure having a bore extending longitudinally therethrough and provided at one end with a counterbore, said anvil having on one side thereof a boss received in said counterbore and provided with a tapped hole in alignment with the bore in said handle structure, and a bolt extending through the bore in said handle structure and threaded into the tapped hole in the boss of said anvil to secure said anvil to said handle structure, said handle structure comprising separate bodies disposed in end-to-end relationship, and said gauge including an apertured lug extending perpendicularly from said cruciform structure and disposed between the adjacent ends of said bodies in surrounding relationship to said bolt.

4. A saw setting tool comprising an elongated handle structure, an anvil disposed on one end of said handle structure, and a gauge secured to said handle structure intermediate the length of the latter and adapted to be placed against the sides of a saw blade to measure the set of the saw teeth, said gauge comprising a cruciform structure extending along and spaced from said handle structure and said anvil, said cruciform structure comprising four arms successively disposed at right angles to each other with their surfaces remote from said handle structure substantially in a common plane, contact buttons on the outer ends of three of said arms having flat outer surfaces disposed substantially in a common plane spaced from and parallel to the first mentioned plane, and a contact button adjustably mounted on the outer end of the fourth arm.

5. A saw setting tool comprising an elongated handle structure, an anvil disposed on one end of said handle structure, and a gauge secured to said handle structure intermediate the length of the latter and adapted to be placed against the sides of a saw blade to measure the set of the saw teeth, said gauge comprising a cruciform structure having one part extending along and spaced from said handle structure and said anvil and another part extending transversely of said handle, said handle structure having a bore extending longitudinally therethrough and provided at one end with a counterbore, said anvil comprising a disc shaped portion having on one face a centrally disposed flat surface and a beveled surface surrounding said flat surface and having on its other face a boss received in said counterbore and provided with a tapped hole in alignment with the bore in said handle structure, and a bolt extending through the bore in said handle structure and threaded into the tapped hole in the boss of said anvil to secure said anvil to said handle structure.

LYLE TOMLINSON.

REFERENCES CITED

The following references are of record in the file of this patent:

UNITED STATES PATENTS

| Number | Name | Date |
| --- | --- | --- |
| 482,250 | Heath | Sept. 6, 1892 |
| 1,055,984 | Vashaw | Mar. 11, 1913 |
| 1,115,709 | McMillan | Nov. 3, 1914 |
| 1,552,092 | Thomas | Sept. 1, 1925 |
| 1,683,174 | Eyrish | Sept. 4, 1928 |
| 2,135,891 | Gommel | Nov. 8, 1938 |